(12) United States Patent
Hog et al.

(10) Patent No.: US 11,024,035 B2
(45) Date of Patent: Jun. 1, 2021

(54) METHOD FOR PROCESSING A LIGHT FIELD IMAGE DELIVERING A SUPER-RAYS REPRESENTATION OF A LIGHT FIELD IMAGE

(71) Applicant: INTERDIGITAL CE PATENT HOLDINGS, SAS, Paris (FR)

(72) Inventors: Matthieu Hog, Thorigné Fouillard (FR); Neus Sabater, Betton (FR); Christine Guillemot, Chantepie (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/466,025

(22) PCT Filed: Nov. 30, 2017

(86) PCT No.: PCT/EP2017/081045
§ 371 (c)(1),
(2) Date: Jun. 1, 2019

(87) PCT Pub. No.: WO2018/100095
PCT Pub. Date: Jun. 7, 2018

(65) Prior Publication Data
US 2020/0082539 A1  Mar. 12, 2020

(30) Foreign Application Priority Data
Dec. 1, 2016 (EP) .................................... 16306591

(51) Int. Cl.
*G06K 9/34* (2006.01)
*G06T 7/174* (2017.01)
*G06T 7/11* (2017.01)

(52) U.S. Cl.
CPC ................ *G06T 7/174* (2017.01); *G06T 7/11* (2017.01); *G06T 2207/10052* (2013.01)

(58) Field of Classification Search
CPC .. G06T 2207/10052; G06T 7/11; G06T 7/174
See application file for complete search history.

(56) References Cited

U.S. PATENT DOCUMENTS 7,003,136 B1 * 2/2006 Harville ............. G06K 9/00201
348/169
8,836,768 B1 * 9/2014 Rafii ...................... G06F 3/0304
348/47

(Continued)

FOREIGN PATENT DOCUMENTS

CN       105913070 A       8/2016

OTHER PUBLICATIONS

Huang, Li-Ren, et. al., "Fast Realistic Block-Based Refocusing for Sparse Light Fields". IEEE International Symposium on Circuits and Systems (ISCAS), (2016), pp. 998-1001.

(Continued)

*Primary Examiner* — Xin Jia
(74) *Attorney, Agent, or Firm* — Invention Mine LLC

(57) ABSTRACT

The present disclosure concerns a method for processing a light field image comprising a set of image views. The method is remarkable in that it comprises: selecting (101) a set of pixels, named centroids, within a given image view in said light field image, each centroid being associated with a unique label and a unique light ray; de-projecting said centroids, that delivers a set of points in a 3D space; re-projecting said points of said set of points in a 3D space in at least one other image view in said light field image, which is different from said reference view, that delivers a set of re-projected centroids; and determining (102), for each pixel, being associated with a light ray, within a neighborhood of a re-projected centroid, a label related to one of the centroids, said determining relying on a proximity criterion in term of color between pixels and centroids, and a proximity criterion in term of spatial distances between pixels (Continued)

and re-projected centroids; and updating (103), for a given centroid, a color value associated with said given centroid, and spatial coordinates of said given centroid within said given image view, wherein said updating comprises: deprojecting pixels in said at least one other image view that are associated with a same label of said given centroid, delivering a set of obtained points; and re-projecting said obtained points into said given image view, delivering a set of projected points; and averaging both color values associated with said projected points and spatial coordinates associated with said projected points for defining updated information related to said given centroid.

19 Claims, 10 Drawing Sheets

(56) References Cited

U.S. PATENT DOCUMENTS

| | | | | |
|---|---|---|---|---|
| 8,854,433 | B1* | 10/2014 | Rafii | G06F 3/017 348/47 |
| 2016/0097858 | A1* | 4/2016 | Mundhenk | G06T 5/50 348/50 |

OTHER PUBLICATIONS

Ng, Ren, et. al., "Light Field Photography With a Hand-Held Plenoptic Camera". Stanford Tech Report (CTSR), (2005), pp. 1-11.
Lumsdaine, Andrew, et. al., "The Focused Plenoptic Camera". IEEE International Conference on Computational Photography (ICCP), (2009), pp. 1-8.
Zhang, Cha, et. al., "A Self-Recontigurable Camera Array". Siggraph Sketches. ACM, (2004), 1 page.
Wilburn, Bennett, et., al., "High-Speed Videography Using a Dense Camera Array". Proceedings of the IEEE Computer Society Conference on Computer Vision and Pattern Recognition, (CVPR), (2004), 8 pages.
Venkataraman, Kartik, et. al., "PiCam: An Ultra-Thin High Performance Monolithic Camera Array". ACM Transactions on Graphics (TOG), vol. 32, No. 6, (2013), 13 pages.
Huang, Chao-Tsung, et. al., "Fast Realistic Refocusing for Sparse Light Fields". IEEE International Conference on Acoustics, Speech and Signal Processing (ICASSP), (2015), pp. 1176-1180.
Wanner, Sven, et. al., "Globally Consistent Multilabel Assignment on the Ray Space of 4D Light Fields". Proceedings of the IEEE Conference on Computer Vision and Pattern Recognition, (2013), pp. 1011-1018.
Mihara, Hajime, et. al., "4D Light-Field Segmentation With Spatial and Angular Consistencies". Proceedings of IEEE International Conference on Computational Photography (ICCP), (2016), 8 pages.
Hog, Matthieu, et. al., "Light Field Segmentation Using a Ray-Based Graph Structure". European Conference on Computer Vision, Springer, (2016), 17 pages.
Seitz, Steven M., et. al., "Plenoptic Image Editing". International Journal of Computer Vision, vol. 48, No. 2, (2002), pp. 115-129.
Jarabo, Adrian, et. al., "Efficient Propagation Of Light Field Edits". Proceedings of the SIACG, (2011), 7 pages.
Ao, Hongbo, et. al., "Light Field Editing Based On Reparameterization". Pacific Rim Conference on Multimedia, (2015), pp. 601-610.
Zhang, Fang-Lue, et. al., "Plenopatch: Patch-Based Plenoptic Image Manipulation". Transactions on Visualization and Computer Graphics, (2016), pp. 1-14.
Shon, Ki Won, et. al., "Spatio-Angular Consistent Editing Framework for 4D Light Field Images". Multimedia Tools and Applications, (2016), pp. 16615-16631.
Chen, Can, et. al., "Light Field Stereo Matching Using Bilateral Statistics Of Surface Cameras". Proceedings of the IEEE Conference on Computer Vision and Pattern Recognition, (2014), 8 pages.
Lin, Haiting, et. al., "Depth Recovery From Light Field Using Focal Stack Symmetry". Proceedings of the IEEE International Conference on Computer Vision, (2015), pp. 3451-3459.
Williem, W., et. al., "Robust Light Field Depth Estimation for Noisy Scene With Occlusion". Proceedings of the IEEE Conference on Computer Vision and Pattern Recognition, (2016), pp. 4396-4404.
Wang, Ting-Chun, et. al., "Occlusion-Aware Depth Estimation Using Light-Field Cameras". Proceedings of the IEEE International Conference on Computer Vision, (2015), pp. 3487-3495.
Ren, Xiaofeng, et. al., "Learning A Classification Model for Segmentation". IEEE, (2003), pp. 1-8.
Achanta, Radhakrishna, et. al., "SLIC Superpixels Compared to State-Of-The-Art Superpixel Methods". IEEE Transactions on Pattern Analysis and Machine Intelligence, vol. 34, No. 11, Nov. 2012, pp. 2274-2281.
Tezuka, Tomoyuki, et. al., "Superpixel-based 3D Warping Using View plus Depth Data from Multiple Viewpoints". Proceedings of SPIE-IS&T Electronic Imaging, SPIE vol. 9011, 90111V, (2014), pp. 1-8.
Wang, Tinghuai, et. al., "Wide Baseline Multi-view Video Matting Using a Hybrid Markov Random Field". International Conference on Pattern Recognition, (2014), 6 pages.
Buyssens, Pierre, et. al., "Eikonal Based Region Growing for Superpixels Generation: Application to Semi-Supervised Real Time Organ Segmentation in CT Images". IRBM, Elsevier Masson, vol. 35 No. 1, 2014 pp. 1-11.
Ortiz-Cayon, Rodrigo, et. al., "A Bayesian Approach for Selective Image-Based Rendering Using Superpixels". IEEE International Conference on 3D Vision, (2015), 10 pages.
Ng, Ren, "Fourier Slice Photography". TOG, vol. 24. ACM, (2005), pp. 735-744.
Tao, Michael W., et. al., "Depth from Combining Defocus And Correspondence Using Light-Field Cameras". Proceedings of the IEEE International Conference on Computer Vision (ICCV), Dec. 2013, pp. 673-680.
Wanner, Sven, et. al., "Globally Consistent Depth Labeling Of 4D Light Fields". IEEE Conference on Computer Vision and Pattern Recognition, (2012), pp. 41-48.
Bishop, Tom E., et. al., "Light Field Superresolution". IEEE International Conference on Computational Photography (ICCP), (2009), pp. 1-9.
Wanner, Sven, et. al., "Variational Light Field Analysis For Disparity Estimation And Super-Resolution". IEEE Transactions On Pattern Analysis And Machine Intelligence (PAMI), vol. 36, No. 3, (2014), pp. 1-15.
An, Xiaobo, et. al., "AppProp: All-Pairs Appearance-Space Edit Propagation". ACM Transactions on Graphics (TOG), vol. 27, No. 3. (2008), 9 pages.
Kopf, Johannes, et. al., "Joint Bilateral Upsampling". ACM Transactions on Graphics (TOG), vol. 26, No. 3, (2007), 5 pages.
Berent, Jesse, et. al., "Unsupervised Extraction Of Coherent Regions For Image Based Rendering". In BMVC, (2007), 10 pages.
Dragotti, Pier Luigi, et. al., "Efficient Segmentation And Representation Of Multi-View Images". Second SEAS DTC Technical Conference—Edinburgh, (2007), 7 pages.
Berent, Jesse, et. al., "Plenoptic Manifolds—Exploiting Structure And Coherence In Multiview Images". IEEE Signal Processing Magazine, Nov. 2007, pp. 34-44.
Van Den Bergh, Michael, et. al., "Seeds: Superpixels Extracted Via Energy-Driven Sampling". International Journal of Computer Vision, vol. 111, No. 3, (2015), pp. 13-26.
Shi, Jianbo, et. al., "Normalized Cuts And Image Segmentation". IEEE Transactions on Pattern Analysis and Machine Intelligence, vol. 22, No. 8, Aug. 2000, pp. 888-905.
Felzenszwalb, Pedro F., et. al., "Efficient Graph-Based Image Segmentation". International Journal of Computer Vision, vol. 59, No. 2, (2004), pp. 167-181.
Moore, Alastair P., et. al., "Superpixel Lattices". IEEE Conference On Computer Vision And Pattern Recognition, (2008), pp. 1-8.
Veksler, Olga, et. al., "Superpixels And Supervoxels In An Energy Optimization Framework". European Conference on Computer Vision, (2010), pp. 211-224.

(56) References Cited

OTHER PUBLICATIONS

Zhang, Yuhang, et. al., "Superpixels Via Pseudoboolean Optimization". IEEE International Conference on Computer Vision., (2011), 8 pages.
Meyer, Fernand, et. al., "Multiscale Morphological Segmentations Based On Watershed, Flooding, And Eikonal PDE". International Conference on Scale-Space Theories in Computer Vision, (1999), pp. 351-362.
Levinshtein, Alex, et. al., "Turbopixels: Fast Superpixels Using Geometric Flows". IEEE Transactions On Pattern Analysis And Machine Intelligence, vol. 31, No. 12, Dec. 2009, pp. 2290-2297.
Vedaldi, Andrea, et. al., "Quick Shift And Kernel Methods For Mode Seeking". European Conference On Computer Vision, (2008), pp. 705-718.
Wang, Peng, et. al., "Structure-Sensitive Superpixels Via Geodesic Distance". IEEE International Conference on Computer Vision, (2011), pp. 447-454.
Birkus, Robert, "Accelerated gSLIC for Superpixel Generation Used In Object Segmentation". Proceedings of CESCG 2015: The 19th Central European Seminar on Computer Graphics, (2015), 8 pages.
Bleyer, Michael, et. al., "Object Stereo—Joint Stereo Matching and Object Segmentation". IEEE Conference on Computer Vision and Pattern Recognition (CVPR), (2011), pp. 3081-3088.
Taguchi, Yuichi, et. al., "Stereo Reconstruction With Mixed Pixels Using Adaptive Over-Segmentation". IEEE Conference on Computer Vision and Pattern Recognition (CVPR), (2008), pp. 1-8.
Campbell, Neill DF, et. al., "Automatic Object Segmentation From Calibrated Images". Conference on Visual Media Production (CVMP), (2011), 12 pages.
Mičušík, Branislav, et. al., "Multi-view Superpixel Stereo in Man-Made Environments". International Journal of computer Vision, vol. 89, No. 1, (2010), pp. 106-119.
Xu, Chenliang, et. al., "Evaluation of Super-Voxel Methods For Early Video Processing". IEEE Conference on Computer Vision and Pattern Recognition (CVPR), (2012), 8 pages.
Levinshtein, Alex, et. al., "Spatiotemporal Closure". Asian Conference on Computer Vision, (2010), pp. 1-14.
Chang, Jason, et. al., "A Video Representation Using Temporal Superpixels". IEEE Conference on Computer Vision and Pattern Recognition (CVPR), (2013), pp. 2051-2058.
Reso, Matthias, et. al., "Temporally Consistent Superpixels". Proceedings of the IEEE International Conference on Computer Vision, (2013), pp. 385-392.
Van Den Bergh, Michael, et. al., "Online Video Seeds For Temporal Window Objectness". Proceedings of the IEEE International Conference on Computer Vision, (2013), pp. 377-384.
Reso, Matthias, et. al., "Fast Label Propagation For Real-Time Superpixels For Video Content". IEEE International Conference on Image Processing (ICIP), (2015), 5 pages.
Yang, Jingyu, et. al., "Graph-Based Segmentation For RGB-D Data Using 3-D Geometry Enhanced Superpixels". IEEE Transactions on Cybernetics, vol. 45, No. 5, May 2015, pp. 913-926.
Gortler, Steven J., et. al., "The Lumigraph". ACM, (1996), pp. 43-52.
Neubert, Peer, et. al., "Superpixel Benchmark And Comparison". Proceedings of Forum Bildverarbeitung, (2012), pp. 1-12.
Scharstein, Daniel, et. al., "A Taxonomy And Evaluation Of Dense Two-Frame Stereo Correspondence Algorithms". IJCV, vol. 47, No. 1-3, (2002), 61 pages.
Boykov, Yuri, et. al., "Fast Approximate Energy Minimization Via Graph Cuts". IEEE Transactions on Pattern Analysis And Machine Intelligence, (2001), 8 pages.
Boykov, Yuri, et. al., "An Experimental Comparison Of Min-Cut/Max-Flow Algorithms For Energy Minimization In Vision". IEEE Transactions on Pattern Analysis and Machine Intelligence, vol. 26, No. 9, Sep. 2004, pp. 1124-1137.
Fiss, Juliet, et. al., "Refocusing Plenoptic Images Using Depth-Adaptive Splatting". IEEE International Conference on Computational Photography (ICCP), (2014), 9 pages.
Kalantari, Nima Khademi, et. al., "Learning-Based View Synthesis For Light Field Cameras". ACM Transactions on Graphics, vol. 35, No. 6, Nov. 2016, pp. 1-10.
International Search Report and Written Opinion of the International Searching Authority for PCT/EP2017/081045, dated Mar. 20, 2018, 10 pages.
Machine Translation of CN105913070A published on Aug. 31, 2016, 5 pages.
International Preliminary Report on Patentability for PCT/EP2017/081045 dated Jun. 4, 2019, 7 pages.
Dansereau, Donald G., et. al., "Linear Volumetric Focus For Light Field Cameras". ACM Transactions on Graphics, vol. 34, No. 2, Article 15, Feb. 2015, pp. 1-20.
Dansereau, Donald G., et. al., "Decoding, Calibration And Rectification For Lenselet-Based Plenoptic Cameras". IEEE Conference on Computer Vision and Pattern Recognition (CVPR), (2013), pp. 1027-1034.

* cited by examiner

Algorithm 1: super-ray algorithm

Data: Input Light Field *LF*
Result: Super-ray assignments $\mathcal{A}$
Initialize centroids on reference view;
while *not (converged OR max. iteration reached)* do
    \\ Assignment step
    for *each centroid c* do
        for *each view $(s', t')$* do
            Compute $(x'_c, y'_c) = \mathcal{P}^{d_c}_{s',t'}(x_c, y_c)$;
            for *each ray r in $\mathcal{N}_S(r'_c)$* do
                $\mathcal{A}(r) = c$ (*c* minimizing $A(r) = \arg\min_c \left( \Delta_{Lab}(r, r_c) + m \, \Delta_{xy}(r, r'_c) \right)$);
    \\ Update step
    for *each centroid c* do
        Compute $\mathcal{P}^{d_c}_{s_c,t_c}(x, y)$, $\forall r \in SR_c$;
        Update $Lab_c$ and $(x_c, y_c)$
Cleanup step

FIG.2

METHOD FOR PROCESSING A LIGHT FIELD IMAGE DELIVERING A SUPER-RAYS REPRESENTATION OF A LIGHT FIELD IMAGE

CROSS-REFERENCE TO RELATED APPLICATIONS

The present application is a national stage application under 35 U.S.C. § 371 of International Application No. PCT/EP2017/081045, titled "A METHOD FOR PROCESSING A LIGHT FIELD IMAGE DELIVERING A SUPER-RAYS REPRESENTATION OF A LIGHT FIELD IMAGE," filed on Nov. 30, 2017, which claims under 35 U.S.C. § 119(b) the benefit of European Patent Application No. EP 16306591.5 titled "SUPER-RAYS FOR EFFICIENT LIGHT FIELD PROCESSING" and filed Dec. 1, 2016.

TECHNICAL FIELD

The disclosure relates to a technique for processing a light field image. More precisely, it concerns a technique for representing a light field image in order to ease the editing of light field image (for removing or adding elements in a scene associated with a light field image).

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Over the past few years, light field capturing devices have gained in popularity, both at the research and the industrial level. These devices can be broadly classified into the following categories. Plenoptic cameras use an array of microlenses placed in front of the sensor of a classical camera in order to capture light fields (see for example the document entitled "*Light field photography with a hand-held plenoptic camera*" by R. ng et al. in Computer Science Technical Report, vol. 2, no. 11, pp. 1-11, 2005, leading to trade spatial resolution for angular resolution. Although this trade-off can be controlled (see for example the document entitled "*The focused plenoptic camera*" by A. Lumsdaine and T. Georgiev, in ICCP, IEEE, 2009, pp. 1-8), the captured light field is always angularly dense (the disparity is of the order of the pixel).

Plenoptic cameras typically target consumer photography via their refocusing feature (e.g. Lytro Illum1), but also the industrial market thanks to the capabilities they offer for passive, accurate, monocular depth estimation (e.g. Raytrix2). Light fields can also be captured by camera arrays (see for example the document entitled "*A self-reconfigurable camera array*" by C. Zhang and T. Chen, in SIGGRAPH Sketches. ACM, 2004, p. 151, and the document entitled "*High-speed videography using a dense camera array*" by B. Wilburn et al., in CVPR, vol. 2. IEEE, 2004, pp. II-294). While being significantly more expensive and harder to use, hence dedicated to professionals, they offer the best spatial resolution (but low angular resolution) and a much larger baseline, making them suitable for applications requiring long range depth estimation, change of viewpoint and view synthesis, such as AR content capture (e.g. Lytro Immerge) or movie post production (e.g. Light-field Technology at Fraunhofer as presented in the document "*Picam: An ultra-thin high performance monolithic camera array*" by K. Venkataraman et al., in ACM Transactions on Graphics (TOG), vol. 32, no. 6, p. 166, 2013). A third category of acquisition devices is the camera gantry (e.g. the Stanford Lego Gantry), where a camera is moved along a plane and shots are taken at regular intervals. These devices are easy to use and implement, and can in theory provide high spatial and angular resolution. However, this type of device is limited to the capture of static light fields. Finally, recent and emerging smart phones are equipped either with several cameras (e.g. Iphone 7, Amazon Fire Phone), or with a single specialized sensor (e.g Pelican Imaging, ProFUSION-25C, or with a Wafer-level-optics camera array (see for example in the document entitled "*Fast realistic refocusing for sparse light fields*" by C. -T. Huang et al., in 2015 IEEE International Conference on Acoustics, Speech and Signal Processing (ICASSP), IEEE, 2015, pp. 1176-1180)) which could, to some extent, capture light fields, not as angularly dense as plenoptic cameras. Because they need to be compact, they also have a much smaller baseline and resolution than camera arrays.

The volume of data inherent to light fields, for all capturing devices, is a real issue for user interaction that requires near real-time processing, potentially on devices having limited computational power. This becomes even more critical for light field videos. A second issue is the ease of use. While users are familiar with 2D image editing, light field editing boils down to edit a 3D capture embedded into a 4D signal.

Hence, there is a need to enable user interaction with the whole light field while entering inputs on one view only. Indeed, so far, most of light field research has focused on typical light field applications: refocusing, depth estimation and super-resolution. The light field editing has only been recently addressed with methods targeting either automatic propagation of user inputs from one view to the others (see for example the document entitled "*Efficient propagation of light field edits*" by A. Jarabo et al., in proceedings of the SIACG, 2011), or object segmentation.

Indeed, state of the art light field editing methods either only deal with densely sampled light fields or use a dense depth estimation to perform user-guided segmentation (see for example the document entitled "*Globally consistent multilabel assignment on the ray space of 4d light fields*" by S. Wanner, in Proceedings of the IEEE Conference on Computer Vision and Pattern Recognition, 2013, pp. 1011-1018, or the document entitled "*4d light-field segmentation with spatial and angular consistencies*" by H. Mihara et al., in Proceedings of IEEE International Conference on Computational Photography (ICCP), 2016, or the document entitled "*Light field segmentation using a ray-based graph structure*" by M. Hog et al., in European Conference on Computer Vision, Springer, 2016, pp. 35-50) or to propagate user inputs (see for example the document entitled "*Plenoptic image editing*" by S. M. Seitz and K. N. Kutulakos, published in the International Journal of Computer Vision, vol. 48, no. 2, pp. 115-129, 2002). Despite the latest advances in light field depth estimation (such as in the document entitled "*Robust light field depth estimation for noisy scene with occlusion*" by W. Williem and I. Kyu Park, in Proceedings of the IEEE Conference on Computer Vision and Pattern Recognition, 2016, pp. 4396-4404 or in the document entitled "*Occlusion-aware depth estimation using light-field cameras*" by T. -C. Wang et al., published in Proceedings of the IEEE International Conference on Computer Vision, 2015, pp. 3487-3495), these methods use computationally expensive regularization to obtain satisfactory depth maps.

Hence, there is a need to provide an alternative to such approach, that uses less operations compared to the mentioned solutions.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In one embodiment of the disclosure, it is proposed a method for processing a light field image comprising a set of image views, the method being characterized in that it comprises:

selecting a set of pixels, named centroids, within a given image view in said light field image, each centroid being associated with a unique label and a unique light ray;

de-projecting said centroids, that delivers a set of points in a 3D space;

re-projecting said points of said set of points in a 3D space in at least one other image view in said light field image, which is different from said reference view, that delivers a set of re-projected centroids; and determining, for each pixel, being associated with a light ray, within a neighborhood of a re-projected centroid, a label related to one of the centroids, said determining relying on a proximity criterion in term of color between pixels and centroids, and a proximity criterion in term of spatial distances between pixels and re-projected centroids; and updating, for a given centroid, a color value associated with said given centroid, and spatial coordinates of said given centroid within said given image view, wherein said updating comprises:

de-projecting pixels in said at least one other image view that are associated with a same label of said given centroid, delivering a set of obtained points; and re-projecting said obtained points into said given image view, delivering a set of projected points; and averaging both color values associated with said projected points and spatial coordinates associated with said projected points for defining updated information related to said given centroid.

In a preferred embodiment, the method for processing is remarkable in that said de-projecting and re-projecting are done according to intrinsic and extrinsic calibration parameters.

In a preferred embodiment, the method for processing is remarkable in that said updating is done for all of the centroids.

In a preferred embodiment, the method for processing is remarkable in that said given image view is a central image view in said set of image views.

In a preferred embodiment, the method for processing is remarkable in that said determining said label is done according to a minimization process that comprises the determination of $$A(r) = \underset{c}{\mathrm{argmin}}\{\Delta_{Lab}(r, r_c) + m \cdot \Delta_{xy}(r, r'_c)\},$$

wherein c is a label associated to a centroid, $r_c$ corresponds to a centroid ray in said given image view having for coordinates $(s_c, t_c, x_c, y_c)$ and associated with a depth $d_c$, $r'_c$ corresponds to a projection of said centroid ray $r_c$ in said at least one another image view, having for coordinates (s',t', $P_{s',t'}^{d_c}(x_c, y_c)$), and wherein r corresponds to said light ray associated with a point, having for coordinates (s',t',x,y), and where $\Delta_{Lab}(r, r_c) = \|Lab_r - Lab_{r_c}\|^2$, and $\Delta_{xy}(r, r'_c) = \|(x,y) - P_{s',t'}^{d_c}(x_c, y_c)\|^2$, wherein $Lab_{r_c}$ corresponds to a color value of said centroid ray $r_c$, $Lab_r$ corresponds to a color value of said light ray r, and m is a weighting parameter.

In a preferred embodiment, the method for processing is remarkable in that said at least two reference images views are used, and said at least two reference image views are far from each other's from an angular point of view.

In a preferred embodiment, the method for processing is remarkable in that said light field image has been acquired by a cameras array.

In a preferred embodiment, the method for processing is remarkable in that said light field image has been acquired by a plenoptic camera.

According to an exemplary implementation, the different steps of the previous mentioned methods are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of modules comprising software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should also be noted that a step of obtaining an element/value in the present document can be viewed either as a step of reading such element/value in a memory unit of an electronic device or a step of receiving such element/value from another electronic device via communication means.

In a variant, it is proposed an electronic device configured to process a light field image comprising a set of image views, the electronic device comprising at least one processor and at least one memory unit associated with said at least one processor, said at least one processor being characterized in that it is configured to:

select a set of pixels, named centroids, within a given image view in said light field image, each centroid being associated with a unique label and a unique light ray;

de-project said centroids, that delivers a set of points in a 3D space;

re-project said points of said set of points in a 3D space in at least one other image view in said light field image, which is different from said reference view, that delivers a set of re-projected centroids; and determine, for each pixel, being associated with a light ray, within a neighborhood of a re-projected centroid, a label related to one of the centroids, said determining relying on a proximity criterion in term of color between pixels and centroids, and a proximity criterion in term of spatial distances between pixels and re-projected centroids; and update, for a given centroid, a color value associated with said given centroid, and spatial coordinates of said given centroid within said given image view, wherein said update comprises:

de-project pixels in said at least one other image view that are associated with a same label of said given centroid, delivering a set of obtained points; and re-project said obtained points into said given image view, delivering a set of projected points; and determine an average of both color values associated with said projected points and spatial coordinates associated with said projected points for defining updated information related to said given centroid.

BRIEF DESCRIPTION OF THE DRAWINGS

The above and other aspects of the invention will become more apparent by the following detailed description of exemplary embodiments thereof with reference to the attached drawings in which:

FIG. 2 presents the flowchart of FIG. 1 as an algorithm;

FIG. 7($b$) presents the image view which is the upper-left image view in the set of images views presented in FIG. 3($a$);

FIG. 7($c$) presents a super-rays representation of the image view presented in FIG. 7($b$), when the process of FIG. 1 or 2 is applied on the light field image of the FIG. 7($a$);

DETAILED DESCRIPTION

Figure 1:
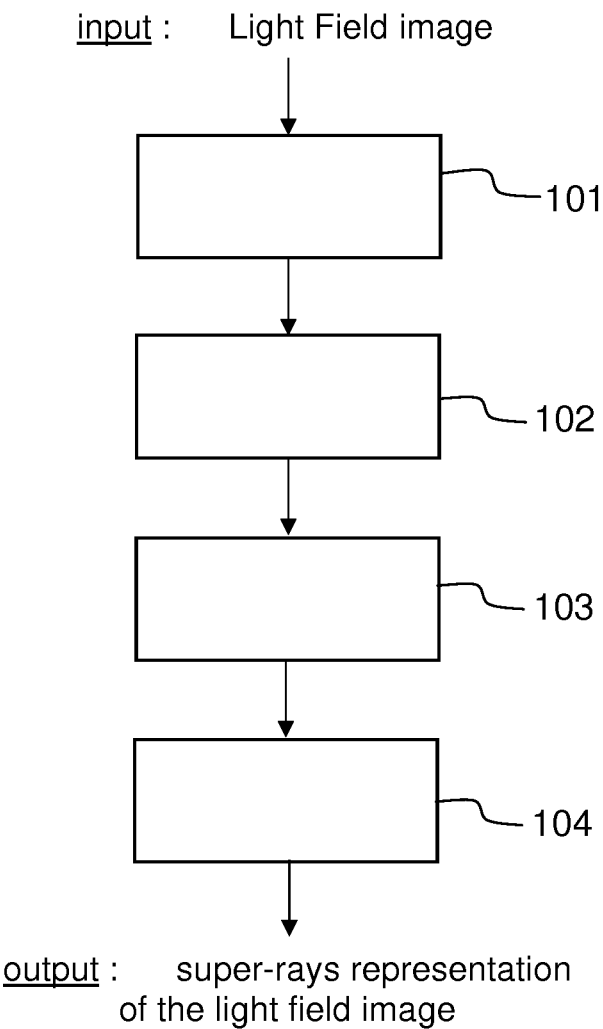
FIG. 1 presents a flowchart corresponding to the main steps that are executed for determining a super-rays representation of a light field image according to one embodiment of the disclosure.

In one embodiment of the disclosure, it is proposed a technique for unsupervised light field over-segmentation which is in addition angular sampling agnostic and that relies less on depth estimation. The present approach is motivated by the observation that, for most editing applications, it might be more important to have accurate object boundaries, even with coarse depth information, than having a refined depth map. It can be shown that, a dense and accurate (in terms of disparity values) depth estimation is not needed for some typical light field applications.

The present document defines the concept of super-ray which is the counterpart of super-pixels (see document entitled "*Learning a classification model for segmentation*", by X. Ren and J. Malik, in ICCV. IEEE, 2003, pp. 10-17) for light fields. The major difference with conventional super-pixels and super-voxels is that super-rays group perceptually similar and corresponding pixels across several views. In other words, super-rays are groups of rays of similar color coming from the same scene area. In the present document, it is proposed the first light field oversegmentation algorithm. It is derived from the SLIC technique (corresponding to the acronym of "Simple Linear Iterative Clustering", described in document entitled "*Slic superpixels compared to state-of-the-art superpixel methods*" by R. Achanta et al., in IEEE transactions on pattern analysis and machine intelligence, vol. 34, no. 11, pp. 2274-2282, 2012), which is super-pixel generation method with good properties in terms of accuracy over complexity and parallelism. Indeed, SLIC super-pixels rely on a reformulation of Loyd's algorithm for the k-means problem with two specific features. First, the distance metric is a weighted sum of the CIELab color distance and the Euclidean pixel distance. Second a search window around the centroid is used to reduce the complexity of the algorithm. This approach has been extended in document entitled "*Structure-sensitive superpixels via geodesic distance*" by P. Wang et al., in International journal of computer vision, vol. 103, no. 1, pp. 1-21, 2013, to take into account a geodesic distance between pixels. Color and spatial information are integrated along the shortest path between two pixels in order to guaranty compactness, color consistency and connectivity.

At last, a new metric is also introduced in order to evaluate an important feature of super-rays: the view-consistency of the oversegmentation.

Let r be a light ray of the light field image noted LF, and (s,t,x,y) its coordinates using the two plane parametrization (described for example in the document entitled "*The Lumigraph*" by S. J. Gortler et al., in Proceedings of the 23rd annual conference on Computer graphics and interactive techniques. ACM, 1996, pp. 43-54), where (s,t) and (x,y) are the angular (view) and spatial (pixel) coordinates respectively. Besides, each light ray has an associated CIELab color value $Lab_r$. In the present document, we note $(x',y'):=P_{s',t'}^d(x,y)\in \mathbb{R}^2$ the spatial pixel position in view (s',t') imaging the same scene point, at a distance d, as (x,y) in view (s,t). This is (x,y) and $P_{s',t'}^d(x,y)$ are corresponding points imaging the same scene point in different views. In particular, in the case of a uniformly sampled light field we have $$P_{s',t'}^d(x,y)=(d(s-s')+x, d(t-t')+y) \qquad \text{(equation(1))}$$

However, if the light field has been acquired with a camera array, P should take into account the extrinsic and intrinsic matrices of each camera, and allow us to estimate the pixel correspondences in this particular setting. Using this notation, r~r' are corresponding rays imaging the same scene point, where $r':=(s',t',P_{s',t'}^d(x,y))$.

Now, given a light field, our goal is to group in the so-called super-rays, all perceptually similar rays corresponding to the same scene area. Formally, we aim to compute the mapping $A:LF \subset \mathbb{Z}^4 \to \mathbb{Z}$, such that each light ray r of the light field image is assigned with a super-ray label c. We define $SR_c$ the set of rays r such that A(r)=c. Each super-ray $SR_c$ is characterized by a centroid ray $r_c$. By definition, the angular coordinates of $r_c$ correspond to the fixed reference view $(s_c,t_c)$. Besides, each centroid ray has a depth $d_c$ associated to it.

FIG. 1 presents a flowchart corresponding to the main steps that are executed for determining a super-rays representation for a given light field image (being a set of image views).

The purpose of processing described in FIG. 1 is to determine a super-rays representation of the image views associated with the light field image.

In a step referenced 101, an electronic device performs an initialization step.

First of all, the spatial positions $(x_c,y_c)$ of the centroid rays are initialized on a regular grid of step S in a reference view.

The corresponding CIELab color values on such positions are the initial color values of the centroid rays $Lab_{r_c}$. Then, a depth $d_c$ is estimated for each centroid ray $r_c$. As this step is important for the rest of the algorithm the depth estimation needs to be robust. Thus, inspired by the works on light field depth estimation described in the document entitled "*Occlusion-aware depth estimation using light-field cameras*" by T. -C. Wang et al., in Proceedings of the IEEE International Conference on Computer Vision, 2015, pp. 3487-3495, we consider a multi-baseline block-matching strategy with angular patches in order to be more robust to occlusions and fattening errors. Let $\Omega$ be the set of angular patches where each patch $o \in \Omega$ is defined such that o(s,t) is 1 f a ray is visible on the view (s,t), and 0 otherwise. Each angular patch can be seen as a visibility mask. In practice, we define $\Omega$ as predefined set of angular patches, one patch that corresponds to the full view visibility and eight patches corresponding to different half view visibilities (top-bottom, right-left and diagonals). See an example for a 3×3 light field image in FIG. 3.

Figure 3:
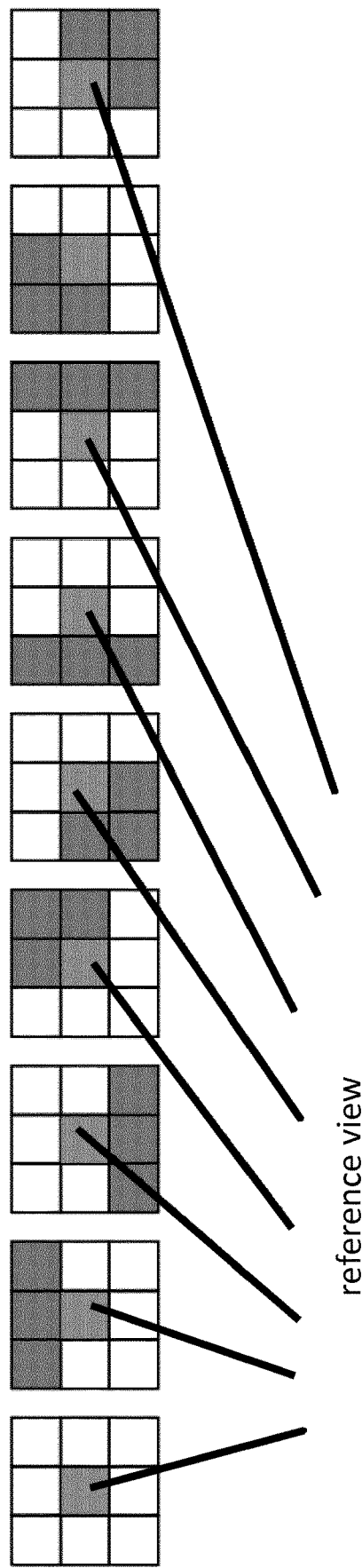
FIG. 3 presents an example of angular patches in $\Omega$ for a light field image comprising 3×3 views.

Indeed, the FIG. 3 presents an example of angular patches in $\Omega$ for a light field image comprising 3×3 views. The angular patches are equal to 1 at the position of the reference view $(s_c,t_c)$. White positions correspond to visible rays, so its value is equal to 1, and grey position (different from the reference view) are equal to 0. The leftmost patch assumes the ray is visible in all views. Other patches correspond to partial visibility.

Hence, the depth for the centroid c is estimated by minimizing the color distance in the RGB color space using the different angular patches $$d_c = \arg\min_d \{\min_{o\in\Omega} \Sigma_{s',t'} o(s',t') \Delta_{RGB}^B(r_c, r'_c)\}, \qquad \text{(equation(2))},$$

where $r'_c=(s',t',P_{s',t'}^d(x_c,y_c))$ and $\Delta_{RGB}^B(r_c,r'_c)=\Sigma_{(i,j)\in[-B,B]}(RGB_{r_c}(i,j)-RGB_{r'_c}(i,j))^2$, is the patch color distance between the patch in the reference view $(s_c,t_c)$ and the patch in $(s',t') \neq (s_c,t_c)$. In particular, $RGB_{r_c}(i,j)$ is the RGB-color value of the ray $(s_c,t_c,x_c+i,y_c+j)$. In the present document, we fix B=3, and we consider 9 angular patches (its size being equal to the number of views in the light field). Since the depth is estimated for a few number of points (the centroids), this choice is acceptable for low complexity applications.

Then, in a step referenced 102, the electronic device performs an assignment step. More precisely, at each iteration, the electronic device assigns a super-ray label to each light ray r(s,t,x,y) of the light field image. First, the depth estimation in the previous step is used to compute the corresponding rays of $r_c$. Formally, we compute $r'_c=(s',t',P_{s',t'}^{d_c}(x_c,y_c))$ such that $r_c \sim r'_c$. Then, each ray in a neighbourhood $N_S(r'_c)$ of size S around $r'_c$ is assigned to the super-ray $SR_c$ if it minimizes the color and spatial distances:

$$A(r) = \underset{c}{\arg\min}\{\Delta_{Lab}(r,r_c) + m \cdot \Delta_{xy}(r,r'_c)\} \qquad \text{(equation (2))}$$

where $\Delta_{Lab}(r,r_c) = \|Lab_r - Lab_{r_c}\|^2$, and $\Delta_{xy}(r,r'_c) = \|(x,y) - P_{s',t'}^{d_c}(x_c,y_c)\|^2$, and m is the parameter weighting the color and spatial distance. A visual explanation can be found in FIG. 4. Note that, when r belongs to the reference view, $r_c = r'_c$ in the equation (2), and the assignment step can be viewed as an equivalent to the SLIC assignment step. However, the approach in the present document allows to coherently assign a label to all rays in the other light field views. It should be noted that in one embodiment of the disclosure, for the assignment step, we presume (as in document entitled "*Light field segmentation using a ray-based graph structure*" by M. Hog et al., in European Conference on Computer Vision. Springer, 2016, pp. 35-50) that two light rays from the same view and close spatial coordinates are likely to image two close scene points. Therefore, a ray that is similar in appearance and close to a centroid light ray or close to one of its corresponding rays is considered likely to belong to the same scene object. Therefore, it should belong to the super-ray corresponding to this centroid.

Then, in a step referenced 103, the electronic device performs an update step. More precisely, the spatial coordinates of the ray centroid and its corresponding Lab values are updated. In particular, the new color value of $r_c$ is the average of the color values of all rays in $SR_c$ and the new spatial coordinates are the average coordinates of all light rays, r=(s,t,x,y) in $SR_c$ projected on the reference view using the depth $d_c$:

$$Lab_{r_c} = \frac{1}{|SR_c|} \sum_{r \in SR_c} Lab_r, \quad \text{(equation 3)}$$

$$(x_c, y_c) = \frac{1}{|SR_c|} \sum_{r \in SR_c} P_{s_c,t_c}^{d_c}(x, y). \quad \text{(equation 4)}$$

Note that the centroid rays are defined on a reference view so its angular coordinates $(s_c, t_c)$ are not changed in our algorithm. On the contrary, the centroid spatial coordinates $(x_c, y_c)$ are first initialized on a regular grid in $\mathbb{Z}^2$, and then updated as in equation (4), which produces new coordinates values in $\mathbb{R}^2$. So, $r_c$ is defined as a virtual light ray which is not necessarily one of the light rays captured in the light field. We summarize the update step in FIG. 5. When updating the spatial coordinates we assume that rays inside the same super-rays are likely to have similar depth, so the process associated with equation (4) is a good approximation with respect to the centroid position we would obtain using the true depth per ray. Furthermore, the process associated with equation (4) ensures that two corresponding rays, on two different views, have nearly the same spatial distance in the equation (2) from a given centroid ray. This is not necessarily the case when seeding the centroids independently on all the view.

In addition, in a facultative step referenced 104, the electronic device can perform a cleanup step. Indeed, similarly to the SLIC method, the execution of steps 101 to 103 does not enforce super-ray spatial connectivity. Therefore, after the grouping of rays around centroids, some rays may remain isolated, especially when the spatial term in the equation $$A(r) = \underset{c}{\operatorname{argmin}} \{\Delta_{Lab}(r, r_c) + m \cdot \Delta_{xy}(r, r'_c)\}$$

has a low weight. Hence, the electronic device can perform in step 104 a simple post-processing method that comprises the re-labeling of super-ray disconnected components (with a number of pixels below a value of $\frac{1}{4} S^2$) with the closest super-ray label.

The main interest of super-rays is to give a compact Multiview representation of the scene, without relying on dense depth estimation. This representation can be used directly or with depth information associated to each centroid ray, as we show in the next section. One main challenge of super-rays is to be as computationally efficient as superpixels. While it would be possible to integrate some photo-consistency prior in the assignment step, this would come with a huge computational cost, since the photo-consistency would either need to be pre-computed for each ray and for each candidate disparity value, or to be computed at each iteration. Moreover, the K-means strategy applied here relies on some strong assumptions on the data (e.g spherical distribution variance, uniform cluster size etc.), that get easily violated when dealing with other quantities such as color and spatial information.

Instead, the approach described in the present document only uses the disparity of centroid rays, and let the spatial distance of the re-projected rays do the grouping. In that sense, the geometric information given by the light field is not fully exploited, but on the other hand, as long as two objects have sufficiently different colors, our approach is still sufficient to yield a good segmentation.

One limitation of this method is that it relies heavily on the centroid depth initialization. Even if we proposed a method to robustify this initial search, errors may have negative consequences on the output segmentation, rays being assigned to the wrong super-ray. Precisely, this is a problem when the disparity error is greater than the super-ray size, as the centroid would potentially fall outside an object during projection. This being said, light-field depth estimation is an active research topic and our depth estimator could be replaced in the future with another sparse and accurate method.

Another limitation is related to occlusions. Indeed, because the projected centroids coordinates are not placed regularly, but rather warped according to the scene depth, zones with large occlusion have few, or no nearby centroids projections. If an occlusion is bigger than the search window of the super-ray, rays of a view might not be assigned to any super-rays.

FIG. 2 presents the flowchart of FIG. 1 as an algorithm. Such algorithm can be represented by instructions that are executed by a processor in an electronic device. It has a physical effect in the sense that it modifies the data (corresponding to the physical representation of the light field image) stored in a memory unit in the electronic device.

Figure 4:
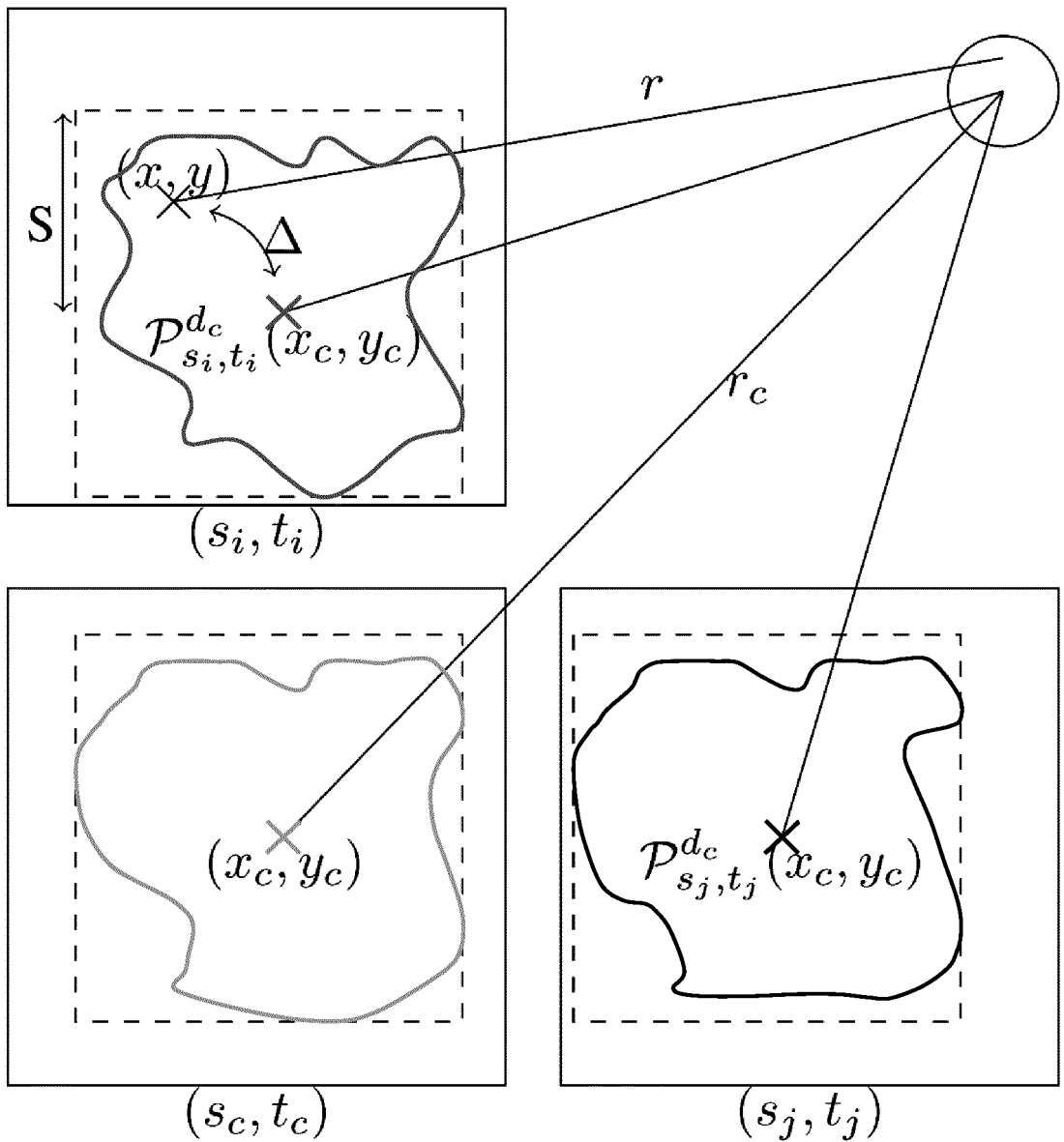
FIG. 4 presents in a schematic way the assignment step mentioned in FIGS. 1 and 2.

FIG. 4 presents in a schematic way the assignment step mentioned in FIGS. 1 and 2. Indeed, a ray r, that is inside a search window of the super-ray $SR_c$, defined according to the projection of its centroid $r_c$, $P_{s',t'}^{d_c}(x_c,y_c)$, in the view where r lies. The color and spatial distance in equation (2) is denoted $\Delta$ in FIG. 4.

Figure 5:
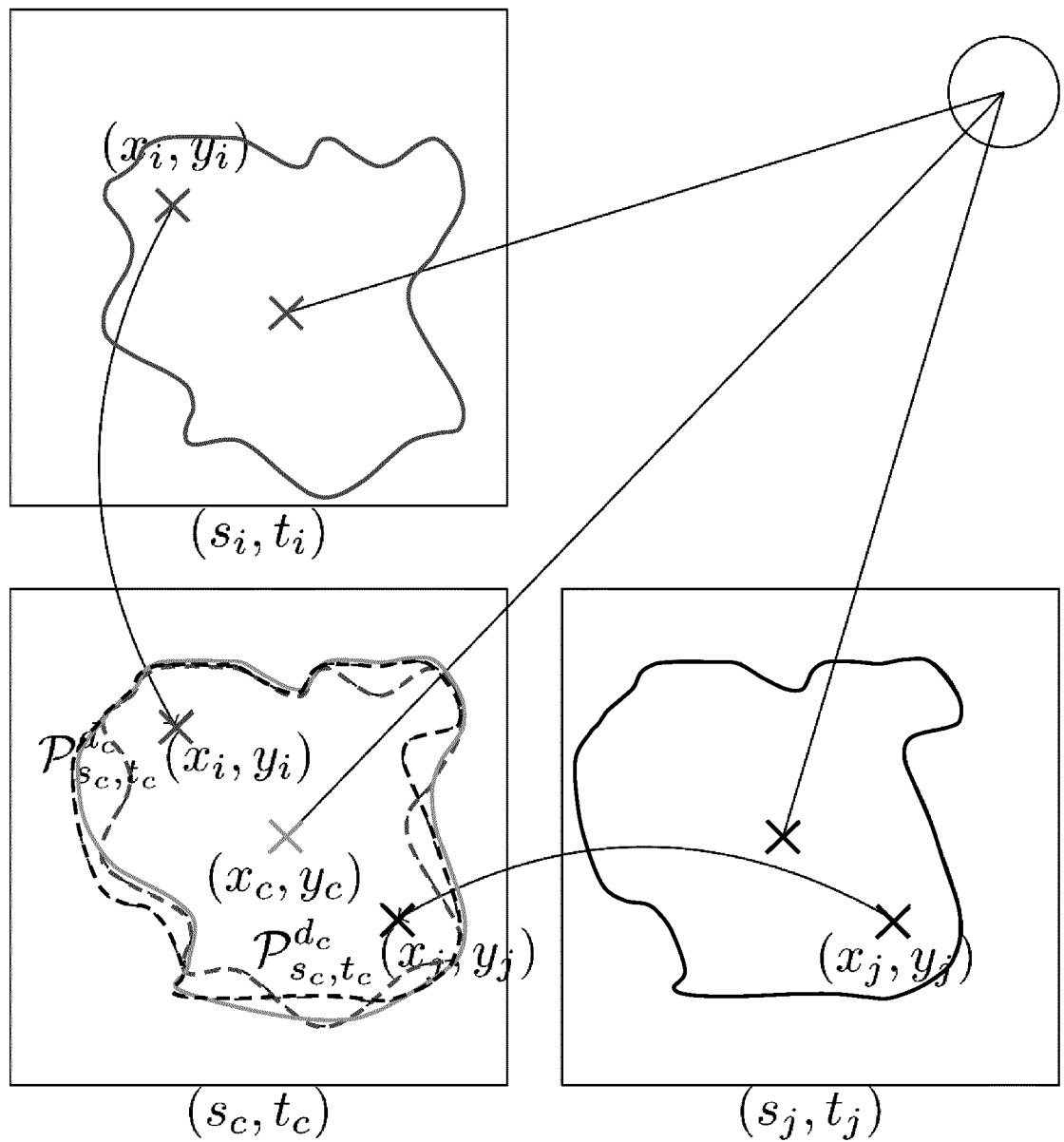
FIG. 5 presents in a schematic way the update step mentioned in FIGS. 1 and 2.

FIG. 5 presents in a schematic way the update step mentioned in FIGS. 1 and 2. Indeed, each ray of the super-ray $SR_c$ is reprojected on the reference view using the depth of the super-ray. For example, the rays $r_i$ and $r_j$ are reprojected on the reference $(s_c, t_c)$. The projection are averaged, giving the new centroid ray position on the reference view $(x_c, y_c)$.

Figure 6:
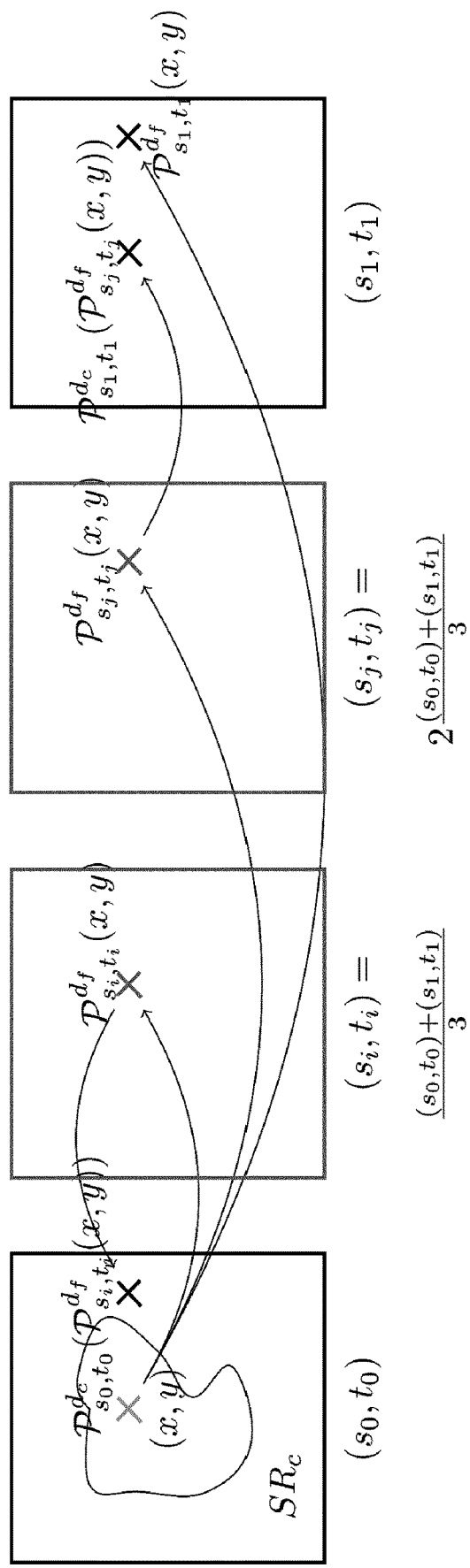
FIG. 6 presents an example of interpolation according to one embodiment of the disclosure when super-pixels representation is used for correcting angular aliasing.

FIG. 6 presents an example of interpolation according to one embodiment of the disclosure. More precisely, it presents an example of interpolation by extrapolating only two views. The captured views are the views $(s_0,t_0)$ and $(s_1,t_1)$, and the virtual ones are the views $(s_i,t_i)$ and $(s_j,t_j)$. We seek to estimate the color value of the pixel at (x,y) when refocusing at depth $d_f$ on the reference view $(s_0,t_0)$, as the sum of colors of (x,y) reprojected in the two physical views $P_{s_1,t_1}^{d_f}(x,y)$ and $P_{s_0,t_0}^{d_f}(x,y)$, but also the two virtual views in between $(s_0,t_0)$ and $(s_1,t_1)$, with a non-integer index. The reprojected colors are obtained by seeking the co responding point in the nearest physical view, using the depth associated with the super-ray to which the ray (s,t,x,y) belongs.

Figure 7A:
FIG. 7($a$) presents a light field image corresponding to a set of 9 images.

FIG. 7(a) presents a light field image corresponding to a set of 9 images.

Figure 7B:

FIG. 7(b) presents the image view which is the upper-left image view in the set of images views presented in FIG. 7(a).

Figure 7C:
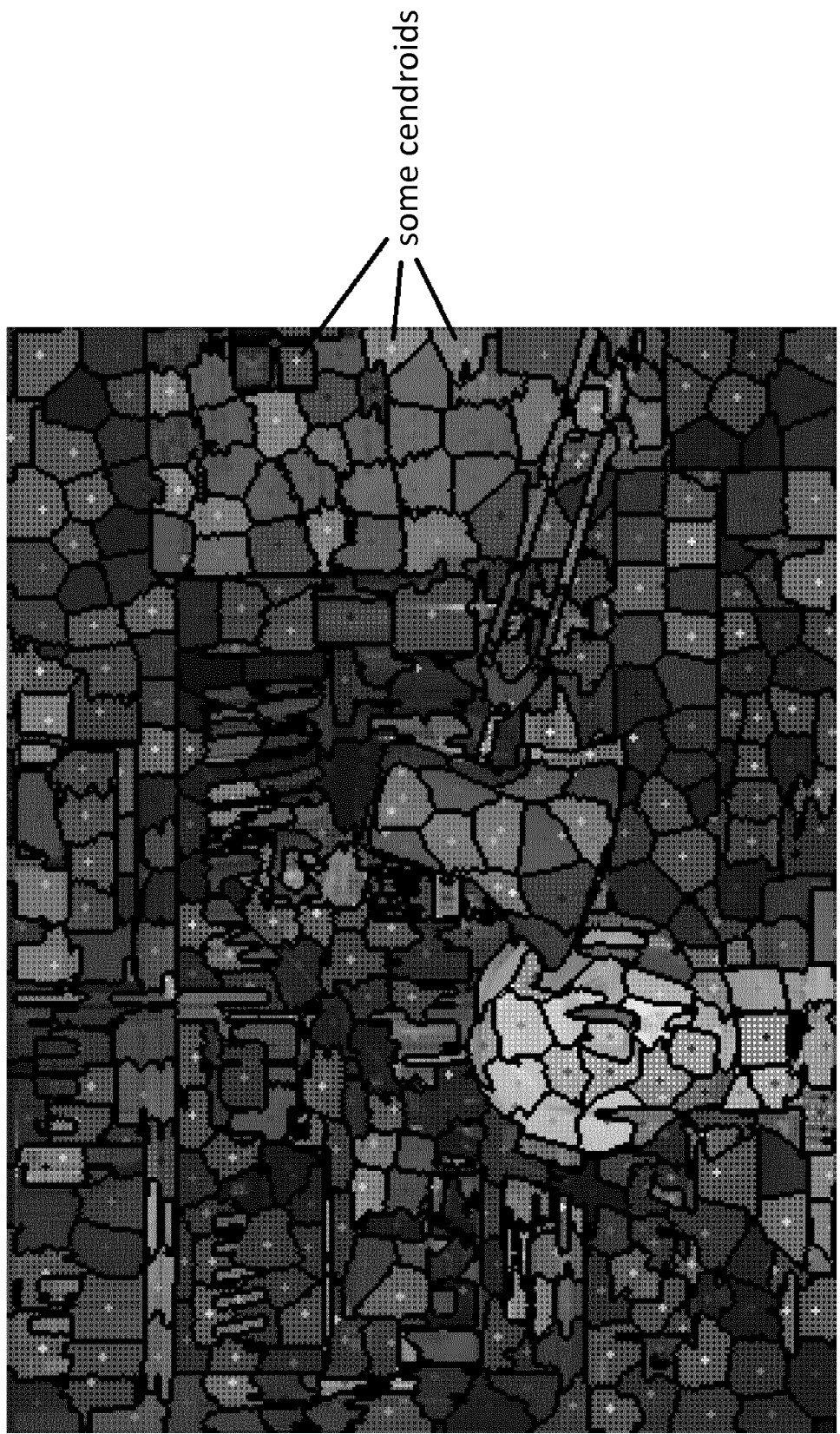

FIG. 7(c) presents a super-rays representation of the image view presented in FIG. 7(b), when the process of FIG. 1 or 2 is applied on the light field image of the FIG. 7(a).

It should be noted that some "area" associated with a super-rays seem to have more than one centroid (see for example on the lamp). However, the centroids presented in FIG. 7(c) corresponds to the superposition of all the centroids from all the image views of FIG. 7(a) (i.e. a kind of map of all the determined centroids from all the image views).

In the following, we propose two examples of editing applications that exploit the super-rays presented in this document. On the one hand, we present a fast light field segmentation method based on super-rays. On the other hand, we present a method for correcting angular aliasing for sparsely sampled light fields.

Real Time Interactive Segmentation

Light field segmentation has a high computational complexity and using super-rays is a good strategy for decreasing it, similarly to temporal super-pixels for video segmentation.

We use the same graph structure introduced in document "*Light field segmentation using a ray-based graph structure*" in which rays of the light field are packed in ray bundles in order to decrease the number of nodes of the graph since there is a node per ray bundle instead of a node per light ray. However, it requires a dense depth estimation per view to determine the ray bundles. On the contrary, our proposed strategy uses the super-rays and the centroid depth estimates to create the graph. This is, we build a graph $\mathcal{G} = \{\mathcal{V}, \mathcal{E}\}$ where each node $\mathcal{V}$ corresponds to one super-ray $SR_c$, and we set an edge of $\mathcal{E}$ between two nodes if the two super-rays share a common border in at least one view (adjacent super-rays). Then, we define the energy $\varphi = \Sigma_{c_i} U(c_i) + s\Sigma_{c_i,c_j \in N(c_i)} P(c_i,c_j)$ (equation (5)), where s is the smoothness parameter, N the function that indicates if two super-rays are adjacent and U and P the unary and pairwise terms respectively. U uses the super-ray average color probability, defined from a Gaussian mixture learnt from the user input and P is defined as a summation of the view conventional pairwise relationship. In order to minimize the equation (5), the multi-label Graph-Cuts algorithm in document entitled "*Fast approximate energy minimization via graph cuts*" by Y. Boykov et al., in IEEE Transactions on pattern analysis and machine intelligence, vol. 23, no. 11, pp. 1222-1239, 2001, and document entitled "*An experimental comparison of mincut/max-flow algorithms for energy minimization in vision*" by Y. Boykov et al., in IEEE transactions on pattern analysis and machine intelligence, vol. 26, no. 9, pp. 1124-1137, 2004, is applied, using an available implementation.

The main interest of using super-rays as a base for segmentation is the gain in running time. Here we spend 1 ms on the alpha expansion in the Graph-Cut step compared to 3 s in document entitled "*Light field segmentation using a ray-based graph structure*". This gain comes at the expense of loosing precision, but the obtained accuracy is sufficient for many real-time applications requiring a fast (rather than accurate) segmentation.

Correcting Angular Aliasing

One of the major new light field applications compared to conventional cameras is the post-capture image refocusing. In fact, light fields captured with Plenoptic type 1.0 cameras provide quite impressive refocusing results but angular aliasing appears when refocusing light fields from camera rigs or refocused plenoptic cameras. This is due to the poor angular sampling of such acquisition systems. Angular aliasing is particularly visible when the simple shift-and-add algorithm is used for refocusing, whereas other solutions such as the adaptive splatting (see document entitled "*Refocusing plenoptic images using depth-adaptive splatting*" by J. Fiss et al., in Computational Photography (ICCP), 2014 IEEE International Conference on. IEEE, 2014, pp. 1-9) or the rendering of novel views (see for example the document entitled "*Learning-based view synthesis for light field cameras*" by N. K. Kalantari et al., in ACM Transactions on Graphics (Proceedings of SIGGRAPH Asia 2016), vol. 35, no. 6, 2016) decrease the artifacts. However, most of the solutions are depth-based methods which makes them unsuitable for fast editing applications. Here we propose to refocus using our super-rays to avoid angular aliasing while maintaining a low complexity. We do not intend to render new views but our philosophy is similar in the sense that we use approximate intermediate views computed with our super-rays. Thus, refocusing is performed via shift-and-add using both original and approximate intermediate views that we call virtual views. With our notations, the shift-and-add method to compute the refocused image at depth d from the viewpoint $(s_c, t_c)$ is defined as $$I_{s_c,t_c}^d(x,y) = \frac{1}{N^2}\sum_{s,t} RGB(s, t, P_{s,t}^d(x,y)),$$

where the original angular coordinates s,t=0, . . . ,N−1 correspond to the original image views available in the light field image. Now, we define the virtual positions $(u,v) \in \mathbb{R}^2$ as $$(u, v) = (s, t) + \frac{1}{\Delta_d}(m, n), m, n = 1 \ldots \Delta_d - 1$$

where the number of virtual views between two original views is $\Delta_d = \lfloor |d_c - d| \rfloor$, the integer part of the absolute value of the depth difference between the refocusing depth d and the centroid depth $d_c$, c being the centroid label to which $(s_c,t_c,x,y)$ belongs. Therefore, the corrected refocused image is defined as the sum of the original images and the virtual views contribution:

$$I_{s_c,t_c}^d(x,y) = \frac{1}{(N \cdot \Delta_d)^2} \qquad \text{(equation (6))}$$

$$\left(\sum_{s,t} RGB(s, t, P^d_{s,t}(x, y)) + \sum_{u,v} RGB(u, v, P^d_{u,v}(x, y))\right)$$

Note that equation (6) requires to interpolate the virtual views, which can be quite memory and time consuming. However, in our strategy we do not explicitly compute them but we use the super-rays depth $d_c$ to approximate ray colors in virtual views:

$$RGB(u,v,P_{u,v}^d(x,y)) \cong RGB([u],[v],P_{[u],[v]}^{d_c}(P_{u,v}^d(x,y))),$$

where ([u],[v]) is the closest original view.

Considering $d_c$ as the depth of all rays of a super-ray is a coarse approximation but it has few or no consequences on the final result since we only approximate for the blurred, out of focus areas. However, the high frequencies on the blur due to the poor angular sampling are successfully removed. Moreover, using the approximate depth information is sufficient to prevent out of focus rays coming from the background to be mixed with occluding in-focus rays which may create artifacts.

Figure 8:
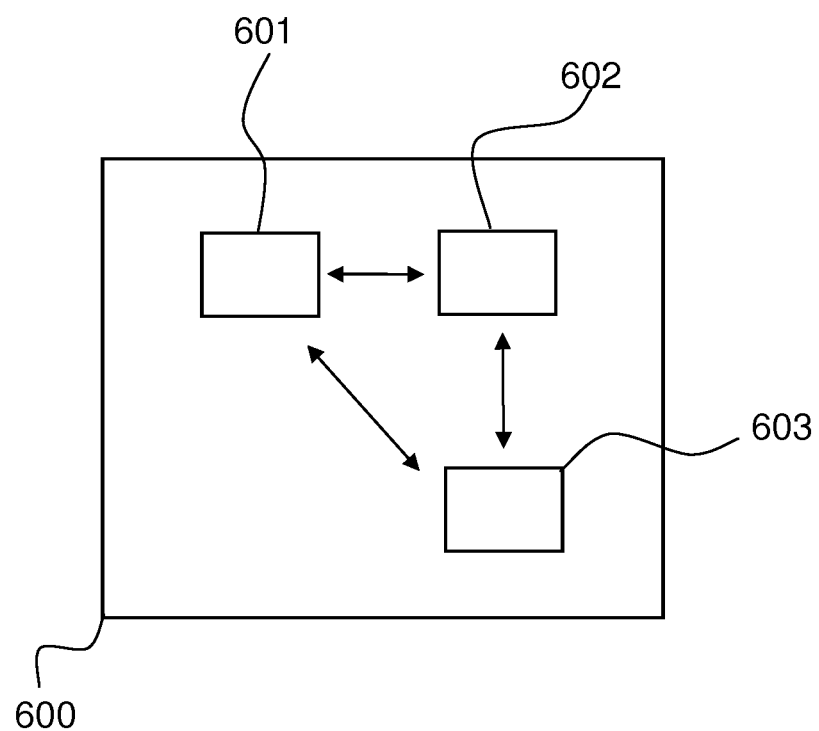
FIG. 8 presents an example of a device that can execute a process according to one embodiment of the disclosure.

FIG. 8 presents an example of an electronic device that can be used to perform one or several steps of methods disclosed in the present document.

Such electronic device referenced 600 comprises a computing unit (for example a CPU, for "Central Processing Unit"), referenced 601, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 602. Computer programs are made of instructions that can be executed by the computing unit. Such electronic device 600 can also comprise a dedicated unit, referenced 603, constituting an input-output interface to allow the device 600 to communicate with other electronic devices. In particular, this dedicated unit 603 can be connected with an antenna (in order to perform communication without contacts), or with serial ports (to carry communications "contact"). It should be noted that the arrows in FIG. 8 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 8.

In one embodiment of the disclosure, the electronic device depicted in FIG. 8 can be comprised in a camera device that is configured to capture images (either conventional 2D images or a sampling of a light field). These images are stored on one or more memory units. Hence, these images can be viewed as bit stream data (i.e. a sequence of bits). Obviously, a bit stream can also be converted on byte stream and vice versa.

At last, it should be noted that the proposed technique is suitable to a GPU implementation. Therefore, the concept of super-rays is suitable to a real-time processing environment.

The invention claimed is:

1. A method for processing a light field image comprising a set of image views, the method comprising;
   selecting a set of pixels, named centroids, within a given image view in the light field image, each centroid being associated with a unique label and a unique light ray;
   de-projecting the centroids, that delivers a set of points in a 3D space;
   re-projecting the points of the set of points in a 3D space in at least one other image view in the light field image, which is different from the reference view, that delivers a set of re-projected centroids; and
   determining, for each pixel, being associated with a light ray, within a neighborhood of a re-projected centroid, a label related to one of the centroids, the determining relying on a proximity criterion in term of color between pixels and centroids, and a proximity criterion in term of spatial distances between pixels and re-projected centroids; and
   updating, for a given centroid, a color value associated with the given centroid, and spatial coordinates of the given centroid within the given image view, wherein the updating comprises:
   de-projecting pixels in the at least one other image view that are associated with a same label of the given centroid, delivering a set of obtained points; and
   re-projecting the obtained points into the given image view, delivering a set of projected points; and
   averaging both color values associated with the projected points and spatial coordinates associated with the projected points for defining updated information related to the given centroid.

2. The method for processing according to claim 1, wherein the de-projecting and re-projecting are done according to intrinsic and extrinsic calibration parameters.

3. The method for processing according to claim 1, wherein the updating is done for all of the centroids.

4. The method for processing according to claim 1, wherein the given image view is a central image view in the set of image views.

5. The method for processing according to claim 1, wherein the determining the label is done according to a minimization process that comprises the determination of $$A(r) = \underset{c}{\operatorname{argmin}}\{\Delta_{Lab}(r, r_c) + m \cdot \Delta_{xy}(r, r'_c)\},$$

wherein c is a label associated to a centroid, $r_c$ corresponds to a centroid ray in the given image view having coordinates $(s_c, t_c, x_c, y_c)$ and associated with a depth $d_c$, $r'_c$ corresponds to a projection of the centroid ray $r_c$ in the at least one other image view, having coordinates $(s',t',P_{s',t'}^{d_c}(x_c,y_c))$, and wherein r corresponds to the light ray associated with a point, having coordinates $(s',t',x,y)$, and where $$\Delta_{Lab}(r,r'_c) = \|Lab_r - Lab_{r_c}\|^2, \text{ and}$$

$$\Delta_{xy}(r,r'_c) = \|(x,y) - P_{s',t'}^{d_c}(x_c,y_c)\|^2,$$

wherein $Lab_{r_c}$ corresponds to a color value of the centroid ray $r_c$, $Lab_r$ corresponds to a color value of the light ray r, and m is a weighting parameter.

6. The method for processing according to claim 1, wherein at least two reference image views are used, and the at least two reference image views are far from each other from an angular point of view.

7. The method for processing according to claim 1, wherein the light field image has been acquired by a camera array.

8. The method for processing according to claim 1, wherein the light field image has been acquired by a plenoptic camera.

9. An electronic device configured to process a light field image comprising a set of image views, the electronic device comprising at least one processor and at least one memory unit associated with the at least one processor, the at least one processor configured to:
   select a set of pixels, named centroids, within a given image view in the light field image, each centroid being associated with a unique label and a unique light ray;
   de-project the centroids, that delivers a set of points in a 3D space;
   re-project the points of the set of points in a 3D space in at least one other image view in the light field image, which is different from the reference view, that delivers a set of re-projected centroids; and
   determine, for each pixel, being associated with a light ray, within a neighborhood of a re-projected centroid, a label related to one of the centroids, the determining relying on a proximity criterion in term of color between pixels and centroids, and a proximity criterion in term of spatial distances between pixels and re-projected centroids; and
   update, for a given centroid, a color value associated with the given centroid, and spatial coordinates of the given centroid within the given image view, wherein the update comprises:
   de-project pixels in the at least one other image view that are associated with a same label of the given centroid, delivering a set of obtained points; and
   re-project the obtained points into the given image view, delivering a set of projected points; and
   determine an average of both color values associated with the projected points and spatial coordinates associated with the projected points for defining updated information related to the given centroid.

10. The electronic device according to claim 9, wherein actions consisting in de-projecting and re-projecting are done according to intrinsic and extrinsic calibration parameters.

11. The electronic device according to claim 9, wherein the update is done for all of the centroids.

12. The electronic device according to claim 9, wherein the given image view is a central image view in the set of image views.

13. The electronic device according to claim 9, wherein the determine the label is done according to a minimization process that comprises the determination of $$A(r) = \underset{c}{\mathrm{argmin}}\{\Delta_{Lab}(r, r_c) + m \cdot \Delta_{xy}(r, r'_c)\},$$

wherein c is a label associated to a centroid, $r_c$ corresponds to a centroid ray in the given image view having coordinates $(s_c, t_c, x_c, y_c)$ and associated with a depth $d_c$, $r'_c$ corresponds to a projection of the centroid ray $r_c$ in the at least one another image view, having coordinates $(s', t', P_{s',t'}^{d_c}(x_c, y_c))$, and wherein r corresponds to the light ray associated with a point, having coordinates $(s', t', x, y)$, and where $\Delta_{Lab}(r, r_c) = \|Lab_r - Lab_{r_c}\|^2$, and $\Delta_{xy}(r, r'_c) = \|(x, y) - P_{s',t'}^{d_c}(x_c, y_c)\|^2$, wherein $Lab_{r_c}$ corresponds to a color value of the centroid ray $r_c$, $Lab_r$ corresponds to a color value of the light ray r, and m is a weighting parameter.

14. The electronic device according to claim 9, wherein at least two reference image views are used, and the at least two reference image views are far from each other from an angular point of view.

15. The electronic device according to claim 9, wherein the light field image has been acquired by a camera array.

16. A method for processing a light field comprising a set of image views, the method comprising:
   selecting a set of pixels as a set of centroids within a first image view in the light field;
   de-projecting the set of centroids to generate a set of points in a 3D space;
   re-projecting the points of the set of points in the 3D space to at least one second image view in the light field to generate a set of re-projected centroids in the at least one second image view, wherein the at least one second image view is different from the first image view;
   determining, for each pixel within a neighborhood of a re-projected centroid of the set of re-projected centroids, an associated one of the centroids, wherein the determining is based on proximity of color between the pixel and the associated one of the centroids and proximity of spatial distance between the pixel and the re-projected centroid; and
   updating a color and a set of spatial coordinates of a given centroid based on colors and spatial coordinates of pixels determined to be associated with the given centroid.

17. The method of claim 16, wherein the updating comprises:
   de-projecting pixels in the at least one second image view that are associated with a first centroid, resulting in a set of obtained points; and
   re-projecting the obtained points into the second image view, resulting in a set of projected points; and
   averaging color values associated with the projected points and averaging spatial coordinates associated with the projected points as updated information related to the first centroid.

18. The method of claim 16, wherein de-projecting and re-projecting are performed according to intrinsic and extrinsic calibration parameters.

19. The method of claim 16, wherein the first image view is a central image view in the set of image views.

* * * * *